United States Patent Office 3,191,528
Patented June 29, 1965

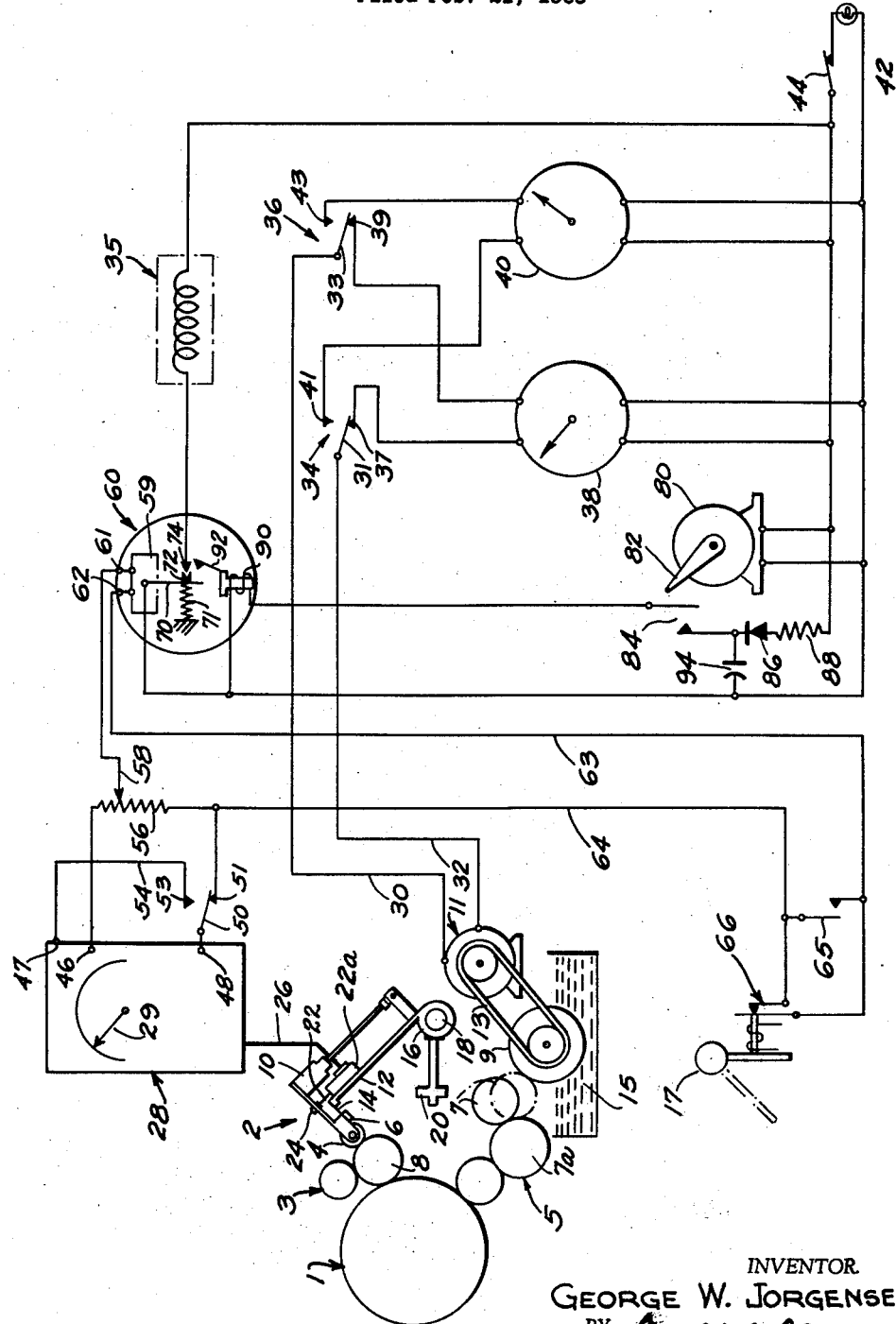

3,191,528
AUTOMATIC DAMPENER CONTROL FOR A
ROTARY LITHOGRAPHIC PRESS
George W. Jorgensen, La Grange Park, Ill., assignor to Graphic Arts Technical Foundation, Chicago, Ill., a corporation of Delaware
Filed Feb. 21, 1963, Ser. No. 260,255
9 Claims. (Cl. 101—148)

This invention relates to means for automatically controlling press dampening and more particularly to the automatic control of press dampening on a lithographic press by measurement of the apparent tack of the ink-water composite in a press inking system.

In present day press inking systems, it requires the skill of an experienced pressman to properly balance the ink and water applied to a printing cylinder. A certain minimum amount of water is needed to keep the plate from catching-up, that is, to prevent ink from appearing in non-image areas. This amount varies principally with the type of plate and with the type of ink and paper being run through the press system. An excess of water beyond this minimum usually causes certain deleterious effects, such as a water accumulation on the press rollers which causes the ink to pile, thereby causing a lowering of the print density. This condition results in poor ink transfer to the printing plate, the blanket, and the paper and usually produces a press sheet with a washed-out appearance. Ordinarily, the best results are achieved with an ink-water balance which utilizes the least possible water; however, in between the aforesaid minimum value and balance where the water is definitely excessive, there appears to be a range of ink-water balances that will print commercially acceptable work.

The individual pressman has a constant problem in trying to stay within this acceptable range. Each new job has its own proper ink-water balance which must be established at the start of the run. If the balance varies during the run, or is slightly different on a re-run, there will be variations in ink transfer. This effect, in turn, will cause variations in ink lay on the sheet as well as variations in the quality and appearance of the printing. Moreover, it is believed that various other problems in press inking systems such as ghosting and poor trapping on multi-color presses may often also be traced to improper ink-water balances.

An apparatus has been developed in the printing art for measuring the tack of an ink film, which is a measure of the film's resistance to being split. Such an apparatus, called an inkometer, measures the force required to split a film of ink from a cylinder roller surface. The ink tack is measured by a strain gauge adapted to measure the torsion force required to split a film of ink from the cylinder surface. The intensity of the electrical signals developed by the strain gauge may then conveniently be observed or recorded by a conventional meter movement.

In accordance with the present invention, it has been found that the inkometer principle can be utilized to determine ink-water balances, since the presence of dampening water in and on the ink film reduces the tack of the film. Thus, an inkometer may be utilized to measure the force required to split a composite film comprising a water and ink mixture. As hereinafter utilized, this measurement will be referred to as the "apparent tack" occasioned by the particular ink-water balance in the press inking system.

Since dampening water is picked up from a dampened press plate by its associated ink form rollers, the amount of water applied to the plate by the dampening system is directly proportional to the amount of water picked up by the form rollers. It has been found that, as more water is sensed by the form rollers so as to alter the ink-water balance thereon, the apparent tack of the composite ink-water film is reduced. Thus, one may acquire an indirect measure of the amount of water being applied to the plate by the dampeners by a measurement of the apparent tack of the film on the form rollers.

This invention utilizes the apparent tack signal developed by a strain gauge inkometer as a control signal in a two speed high-low motor control circuit. A drive motor is connected to a water pan roller which indirectly dampens the press cylinder. The motor, which is responsive to the control circuit, can thus operate at two speeds, a first slow speed to supply just enough water for stand-by or idling speed of the press, and a second high speed to supply sufficient water for printing speed of the press. During the press run, the motor speed varies between these two speeds depending upon the inkometer strain gauge signal delivered to a relay system. The relay system in turn determines the high or low motor speed operation, and the said motor speeds may be set at given predetermined values by utilization of voltage regulators or variable transformers.

Means are provided for periodically sampling the signal level being developed by the inkometer. At a start of a given operation, the pressman sets the controls to manual operation and adjusts the water feed in the conventional manner until a satisfactory ink-water balance has been achieved. The inkometer measures this balance, and the pressman then sets a cut-in control dial to this value and switches to automatic control. The inkometer then continuously measures the ink-water balance during the press run and sends its signal to the automatic control system which, in turn, controls the drive speed of the water pan roller which supplies water to the plate via the dampening rollers. If the inkometer signals that the ink-water balance has become drier, it speeds up the water pan roller to feed more water to the plate; conversely, if the inkometer signals that the ink-water balance has become wetter, it slows down the operation of the water pan roller.

The signal level is periodically sensed at predetermined time intervals in order to achieve accurate results, since the inherent slowness of the ink-water balance to reach a new equilibrium after a given change in water feed would otherwise complicate proper functioning. Additionally, means are provided for automatically lowering the motor speed to the low speed level whenever the form rollers are off the plate during make-ready, idling, trip-off, and the like non-printing sequences.

Accordingly, it is a primary object of this invention to provide an automatic control system for maintaining the ink-water balance of a composite ink film on a printing plate between predetermined levels.

It is also an object of this invention to provide the desired automatic control by utilization of electrical signals developed in a strain gauge inkometer as the primary sensor in a simple and reliable two-speed motor control circuit for determining the rate of operation of a water pan roller in a press inking system.

It is a further object of this invention to automatically and periodically sample the inkometer signals at predetermined periodic intervals for comparison with a given signal level selected at the start of the press run, such that the rate of dampening may be automatically altered as required.

It is a still further object of this invention to provide means for automatically dropping the rate of water dampening to a given predetermined low speed level whenever the press inking system is placed in a non-printing sequence of operation.

These and other objects, advantages, and features of the subject invention will hereinafter appear, and, for purposes of illustration, but not of limitation, a schematic exemplary embodiment of the subject invention is shown in the appended drawings, as hereinafter described.

The press inking system shown in the drawing comprises a printing plate cylinder 1 having a form roller system 3 and a dampener roller system 5 operatively connected thereto in a conventional manner. A tack measuring device generally designated by the numeral 2 comprises a roller 4 mounted in a suitable bearing in an upper frame 6 and situated adjacent a roller 8 of the form roller system 3. The opposite end of the frame 6 supports an oil-type dash pot 10, which is provided to permit a smooth signal from the tack measuring device 2 by dampening the press vibrations.

A torsion plate 14 interconnects the upper frame 6 and a lower frame 12. Preferably, the torsion plate 14 comprises a thin piece of spring metal which is rigidly affixed at its opposite ends to the respective frames 6 and 12. A bearing 16 is mounted at the bottom of the lower frame 12, and a support bar 18 passes through the bearing 16 and extends across the press. The bar 18, which is fastened to the sides of the press, supports the inkometer device and allows it to be moved against the roller. The roller 4 of the tack measuring or inkometer device 2 is gravity loaded against the form roller 8 by a counterweight 20 which is connected to the bearing 16 for pivotal movement relative to the support bar 18. In this manner, the frame 6 is adapted for pivoting movement relative to the frame 12 due to flexing movement of the torsion plate 14 when a suitable torque is applied to the frame 6, as for example a torque applied to the roller 4 by virtue of its interengagement with the form roller 8.

An electrical strain gauge 22 is mounted in a gauge housing 22a which is rigidly positioned on the lower frame 12, and the gauge 22 is also connected by a stud 24 to the upper frame 6. Electrical connectors 26 carry electrical signals from the strain gauge 22 to an ammeter reading circuit 28, which may conveniently be provided with a meter arm 29 for indicating the intensity of the electrical signal developed by the strain gauge 22.

The principle of operation of the tack measuring device 2 is as follows. When actuated by rotation of the printing plate cylinder 1, the roller 8 of the form roller system 3 drives the roller 4 of the tack measuring device 2. Splitting of the ink film between the rollers 8 and 4 as they separate after rolling in contact produces a torque. In other words, the tack of the ink film tends to pull roller 4 in the direction of its rotation. Since the upper frame 6 is fastened to the lower frame 12 by means of the torsion plate 14, the torque induced by the tack of the ink film causes frame 6 to pivot slightly. This pivoting movement of the frame 6 is relayed to the electrical strain gauge 22 by the stud 24 affixed to the frame 6. Thus, the amount of movement of the frame 6 is correlated to the tack sensed by the roller 4, and a corresponding electrical signal is generated by the strain gauge 22.

The press inking system is also provided with a water pan 15 having a water pan roller 9 partially immersed therein. The roller 9 is driven by a drive motor 11, as by a belt drive means 13. The dampening roller 7 of the dampening system 5 is adapted to be moved toward and away from the water pan roller 9 in a conventional manner, as indicated in the drawing by the solid and dotted line positions for the dampening roller 7. As the partially immersed water pan roller 9 rotates in the water pan 15, water is conveyed through the dampening system 5 to the printing plate cylinder 1 and thus to the form roller system 3. The tack measuring device 2 then measures the apparent tack of the composite ink-water film developed on the surface of the roller 8 of the form roller system 3 and thus provides an indirect measure of the amount of water being supplied to the printing plate cylinder 1. In a manner hereinafter described, the apparent tack signal thus developed is utilized as a primary sensor in a motor control circuit for determining the operating speed of the drive motor 11.

Leads 30 and 32 connect the drive motor 11 to movable contact arms 31 and 33 of relay switches 34 and 36 respectively. The contact arms 31 and 33 are normally placed in the down position adjacent contacts 37 and 39 respectively, as shown in the drawing, but, when relay coil 35 is energized, the contact arms 31 and 33 are elevated to an up position adjacent contacts 41 and 43 respectively. A low speed voltage regulator 38 is connected across the contacts 37 and 39 and across power source 42 via an on-off switch 44. Similarly, a high speed voltage regulator 40 is connected across the contacts 41 and 43 and the power source 42. The designated voltage regulators are adapted for predetermined settings to a given output level, as, for example, a relatively low output level from the regulator 38 as compared to a relatively high output level from the regulator 40. In this manner, with the switch 44 closed, the drive motor 11 will be energized at one given rate when the contact arms 31 and 33 are in the down position shown in the drawing, and will be energized at a relatively higher rate when the contact arms 31 and 33 are elevated to the up position adjacent the contacts 41 and 43. Thus, energization of the relay coil 35 determines a high speed rate of operation for the drive motor 11, whereas de-energization of the relay coil 35 determines a low speed rate of operation for the drive motor 11.

The relay coil 35 is energized and de-energized in the following manner: Terminals 46 and 48 of the ammeter reading circuit 28 have an electrical signal developed by the strain gauge 22 impressed thereacross. The terminal 46 is connected to one end of the potentiometer resistor 56, and the terminal 48 is normally connected to the other end of potentiometer resistor 56 through a switch 50 which is normally positioned adjacent a contact 51. The switch 50 is a manual cut-off, and, when the switch 50 is placed adjacent the contact 53, the potentiometer resistor 56 is open circuited and terminal 48 is connected by lead 54 and switch 50 to terminal 47 of the ammeter reading circuit 28. Thus, the pressman may operate the press inking system until the meter arm 29 indicates a satisfactory ink-water balance as measured by the apparent tack of the composite ink-water film, or, alternatively, the pressman may select the desired operating level by mere visual inspection. At any rate, when the proper ink-water balance is achieved, the switch 50 is positioned adjacent the contact 51, such that the output potential of the ammeter reading circuit 28 is impressed across the potentiometer resistor 56.

An ammeter responsive relay 60 (e.g., a microampere Sensitrol relay, such as Model 813, manufactured by the Weston Electrical Instrument Corporation, Newark, New Jersey) is responsive to the potential of the potentiometer resistor 56 in the following manner: A potentiometer arm 58 is connected to terminal 61 of relay coil 59, which is contained in the relay 60. A lead 64 connects one end of the potentiometer resistor 56 to one side of a switch 66, and a lead 63 connects the other side of the switch 66 to terminal 62 of the relay coil of the relay 60. A manual cut-off switch 65 is provided for interconnecting the leads 63 and 64, and the leads 63 and 64 may also be interconnected through the closed switch 66, as shown in the drawing. A form roller lever system 17 is adapted to automatically close the switch 66 when the form roller system 3 is in contact with the printing plate cylinder 1, and to open circuit the switch 66 when the form roller system 3 is removed from the printing plate cylinder 1, as during idling, make-ready, trip-off, stop, and other non-printing sequences of operation for the press inking system (as indicated by the solid and dotted line positions for the form roller lever system 17 in the drawing). The manual cut-off switch 65 may be utilized to interconnect the leads 63 and 64, if desired, regardless of the disposition of the form roller lever system 17 and therefore of the switch 66.

In this manner, the output potential of the ammeter reading circuit 28 (or a portion thereof as determined by the position of the potentiometer arm 58) is impressed across the terminals 61 and 62 of the relay coil 59 of the relay 60. The potentiometer arm 58 thus gives an additional control level to the pressman, who may adjust the sensitivity or cut-in value of the relay coil 59 to a predetermined level by appropriate manipulation of the potentiometer arm 58.

Energization of the relay coil 59 by the potential impressed across the terminals 61 and 62 thereof will cause a corresponding deflection of coil arm 70 in a well known manner. The coil arm 70 is deflected against the force of a spring 71 so as to position its associated contact point 72 adjacent a stationary contact point 74. The contact points 72 and 74 are permanently magnetized such that they will tend to be held in a closed-contact position once a sufficient deflection of the arm 70 has been achieved. The arm 70 is in series with the relay coil 35 through the adjacent contacts 72 and 74, and thus establishment of this series connection will energize relay coil 35 since the series combination of the arm 70 and the relay coil 35 are in series with the power source 42.

Means are provided for automatically and periodically sampling the signal level developed in the relay coil 59. These means comprise a series combination of a resistor 88, a rectifier 86, a switch 84, and a reset relay coil 90; a capacitor 94 in parallel with the series combination of the switch 84 and the reset coil 90; and a cyclic motor 80 with its driven periodic cam lever 82. The motor 80 is connected across the power source 42 so as to constantly rotate the lever 82 when the on-off switch 44 is closed. Once during each cycle of revolution, the lever 82 will momentarily close the switch 84. Obviously, when the switch 84 is closed, the reset relay 90 will be momentarily energized, and, even after the switch 84 is again open-circuited, the direct current charge stored in the capacitor 94 (which is in series with the rectifier 86 and the power source 42) will dissipate across the reset coil 90 in the well-known time delay manner.

When the reset coil 90 is thus energized, it will deflect its associated lever 92 (to the left in the drawing) so as to break the adjacent positioning of the contacts 72 and 74. The spring 71 will then retain the arm 70 in the broken contact position once the magnetically attracted contacts 72 and 74 are sufficiently spaced. However, if the signal developed in the relay coil 59 is still sufficiently great to deflect the arm 70 against the force of the spring 71, the contacts 72 and 74 will again be magnetically attracted into a self-locking position. In this manner, the signal level in the relay coil 59 is periodically tested at timed intervals so as to establish whether a sufficient apparent tack measurement signal is being generated for energization or de-energization of the relay 35. In actual practice, the periodic testing of the signal level as described is sufficiently instantaneous so as to prevent any unwarranted movement of the contact arms 31 and 33 associated with the relay 35 (apparently due to transient effects tending to maintain the contact arms 31 and 33 in a given position).

In operation, the pressman selects a given setting for the voltage regulators 38 and 40 so as to define the high and low speed rates of operation for the drive motor 11. The form roller system 3 is then placed in contact with the printing plate cylinder 1, and the form roller lever system 17 automatically closes the switch 66. The dampening roller system 5 is placed in operative engagement with the water pan roller 9 and the printing plate cylinder 1. The switch 44 may then be closed so as to set into operation the automatic control circuitry hereinbefore described. The pressman selects a given position for the potentiometer arm 58 so as to adjust for the desired level at which the relay 35 will be energized in order to shift from the normal low speed operation to a high speed operation. During this described operation, if, for any reason, the form roller system 3 is temporarily removed from the printing plate cylinder 1 (as by a stop, idle, take-off, or other non-printing sequences of the operation), the switch 66 will be open circuited, and the drive motor 11 will automatically be driven at the low speed rate of operation determined by the setting of the powerstat 38. If desired, the manual by-pass switch 65 may be closed, such that automatic two-speed control of the press dampening operation will be maintained even during the described instances of non-printing operation. The cyclic motor 80 will continuously operate to intermittently activate the reset relay 90 in order to sense the signal levels developed in the relay 60 at predetermined intervals. In practice, one minute samplings have been found suitable for most press inking system operations.

It should be understood that the description herein is merely exemplary and that various changes, modifications, and alterations may be made in the details of construction, arrangements, and operations of the various elements, without departing from the spirit and the scope of the instant invention, as defined in the appended claims.

What is claimed is:

1. Means for automatically controlling the ink-water balance of a dampened press inking system having ink form rollers and a water pan roller operatively connected to the press cylinder thereof whereby an ink-water composite is provided on the press cylinder, comprising:
    means for measuring the apparent tack of the ink-water composite on the surface of a press cylinder;
    means for converting the apparent tack measurement into an electrical signal whenever the apparent tack reaches a predetermined level;
    drive means for the water pan roller;
    means adapted for connection to a power source for energizing the drive means at variable speeds;
    relay switch means adapted in a first normal position to determine a first speed for the drive means and in a second energized position to determine a second speed for the drive means; and
    relay means adapted to be actuated by the electrical signal so as to energize the relay switch means to its second position.

2. Means for automatically controlling the ink-water balance of a dampened press inking system having ink form rollers and a water pan roller operatively connected to the press cylinder thereof whereby an ink-water composite is provided on the press cylinder, which comprises:
    means for measuring the apparent tack of the ink-water composite on the surface of the press cylinder by measuring the apparent tack of the ink-water composite on the surface of a form roller;
    means for converting the apparent tack measurement into an electrical signal whenever the apparent tack reaches a predetermined level;
    drive means for operating the water pan roller;
    means adapted for connection to a power source for energizing the drive means at predetermined variable speeds;
    relay switch means adapted in a first normal position to determine a first speed for the drive means and in a second energized position to determine a second speed for the drive means;
    sensing relay means adapted to be actuated by the electrical signal so as to energize the relay switch means to its second position; and
    means for periodically sampling the signal level of the said electrical signal being sensed by the said sensing relay means.

3. Means as claimed in claim 2 and further comprising means for automatically interrupting the transmission of the said electrical signal to the said sensing relay means during predetermined instances in the sequence of operation for the press inking system.

4. Means as claimed in claim 2 wherein the said means for measuring the apparent tack of the ink-water composite comprises a strain gauge inkometer.

5. Means as claimed in claim 4 wherein the said means converting the apparent tack measurement into an electrical signal comprises a potentiometer.

6. Means as claimed in claim 2 wherein the said means for periodically sampling the signal level of the said electrical signal being sensed by the said sensing relay means comprises a cyclic motor having a cam lever for periodically closing a switch and reset relay means for sampling the signal level of the said electrical signal in response to closure of the said switch.

7. Means for automatically controlling the ink-water balance of a dampened press inking system equipped with a water pan roller and ink form rollers operatively connected to the press cylinder thereof whereby an ink-water composite is provided on the press cylinder, which comprises:

strain gauge means for measuring the apparent tack of the ink-water composite on the surface of a form roller;

means including a potentiometer converting the apparent tack measurement into an electrical signal whenever the apparent tack reaches a predetermined level;

motor drive means for the water pan roller;

a first voltage regulator adapted for connection to a power source for energizing the motor drive means at one speed level;

a second voltage regulator adapted for connection to the power source for energizing the motor drive means at a second speed level;

relay switch means normally connecting the said first voltage regulator to the motor drive means and adapted when energized to connect the said second voltage regulator to the motor drive means;

sensing relay means adapted to be actuated by the electrical signal so as to energize the relay switch means; and means for periodically sampling the signal level of the said electrical signal being sensed by the said sensing relay means comprising a switch adapted to be periodically open and closed and reset relay means for temporarily open-circuiting the said sensing relay means in response to closure of the switch.

8. Means as claimed in claim 7 and further comprising a cyclic motor having a cam lever operatively connected thereto for periodically closing the said switch.

9. Means as claimed in claim 2 and further comprising means for adjusting the said predetermined level of the apparent tack measurement.

References Cited by the Examiner
UNITED STATES PATENTS

| | | | |
|---|---|---|---|
| 2,971,461 | 2/61 | Bradford et al. | 101—426 |
| 2,972,944 | 2/61 | Dahlgren | 101—148 |
| 2,993,371 | 7/61 | Greubel | 73—150 |

EUGENE R. CAPOZIO, *Primary Examiner.*